UNITED STATES PATENT OFFICE.

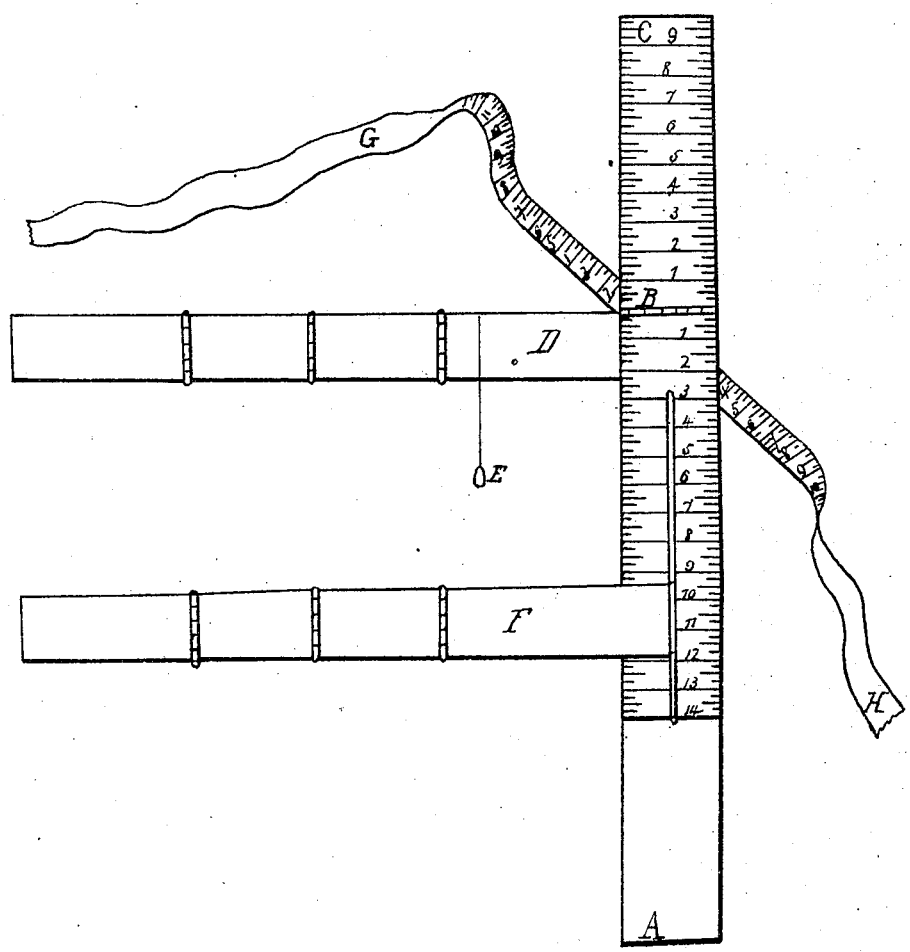
H. Donges.
Tailors' Measure.
No. 4477.   Patented Apr. 25, 1846.

HENRY DONGES, OF NEWPORT, PENNSYLVANIA.

IMPROVEMENT IN TAILORS' MEASURES.

Specification forming part of Letters Patent No. 4,477, dated April 25, 1846.

*To all whom it may concern:*

Be it known that I, HENRY DONGES, of the borough of Newport, county of Perry, and State of Pennsylvania, have invented a new and useful standard by the use of which the actual measurement of the body can be accurately obtained for cutting garments; and I do hereby declare the following to be a full and exact description.

The advantage of my invention over any other that have come under my notice consists in the accuracy with which the measure of a person can be taken, no matter how deformed, especially that of the shoulder and scye, and the simplicity of its application at every point without the aid of protractor or scale, so that misfits cannot be made when the standard and measure are correctly applied and the principle upon which it is founded strictly adhered to.

The annexed figure represents the standard. A, B, and C is an upright thirty-four inches in height, with a hinge ten inches from the top; D, an arm two feet in length, with joints which can be shifted to either side; E, a plummet; F, a sliding arm two feet in length, with joints; G H, a tape-measure, which is fastened on a pivot, and can also be shifted to either side.

In the application of this standard to the person measured, A is placed firmly against the hip, the arm D close under the arm, the joint at B so bent as to place the upright C where the shoulder-seam is desired to be, and the arm F to the point where the waist-seam is desired to be, the whole to be perfectly perpendicular, which can be done by the aid of the plummet. The standard being thus placed, the measurer, which is fastened at B and numbered from that point, can then be applied to every part of the body. From this important point the arm D is bent across the back and the measure taken from the socket-bone to where D strikes the center of the back, by means of which the bottom of the scye is accurately obtained. By means of the upright C, which is divided into inches and fractions from B, the height as well as the width of the shoulder can be accurately obtained, and with the arm F the length of the waist and back, as well as the necessary spring, can be measured with much precision, and the plummet will bring every point to its proper place when the person measured stands at ease.

The dimensions of the above standard may be varied to suit the opinion of the constructor without departing from its principle.

What I claim, and desire to secure by Letters Patent, is—

The combination of the standard B, the hinged or jointed strap D, and the jointed sliding arm F.

HENRY DONGES.

Attest:
M. STEEVER,
S. SCHRACK.